United States Patent [19]

Buhl et al.

[11] Patent Number: 5,024,825
[45] Date of Patent: Jun. 18, 1991

[54] PROCESS FOR THE PREPARATION OF DICALCIUM PHOSPHATE

[75] Inventors: Horst Buhl; Josef Holz; Franz-Josef Dany, all of Erftstadt, Fed. Rep. of Germany

[73] Assignee: Hoechst Aktiegesellschaft, Fed. Rep. of Germany

[21] Appl. No.: 521,737

[22] Filed: May 10, 1990

[30] Foreign Application Priority Data

May 13, 1989 [DE] Fed. Rep. of Germany ....... 3915746

[51] Int. Cl.$^5$ ...................... C01B 15/16; C01B 25/26
[52] U.S. Cl. .................................. 423/309; 423/266; 423/308; 423/311
[58] Field of Search ................ 423/308, 309, 311, 266

[56] References Cited

U.S. PATENT DOCUMENTS

| | | | |
|---|---|---|---|
| 2,977,190 | 3/1961 | Yates et al. | 423/309 |
| 4,166,839 | 9/1979 | Skauli et al. | 423/309 |
| 4,294,621 | 10/1981 | Maurer et al. | |
| 4,931,272 | 6/1990 | Dany et al. | |

FOREIGN PATENT DOCUMENTS

| | | | |
|---|---|---|---|
| 729532 | 3/1966 | Canada | 423/309 |
| 1090531 | 12/1980 | Canada | |
| 0240880 | 10/1987 | European Pat. Off. | |
| 3705845 | 9/1988 | Fed. Rep. of Germany | |

Primary Examiner—Gregory A. Heller
Attorney, Agent, or Firm—Connolly and Hutz

[57] ABSTRACT

For the preparation of dicalcium phosphate dihydrate stabilized with dimagnesium phosphate trihydrate and sodium pyrophosphate, an aqueous suspension of calcium carbonate is introduced into a reactor and recirculated by pumping through a high-speed mixer at 3,500 to 8,000 rpm which is in flow connection with the lower and upper portion of the reactor. Into the mixer an amount of phosphoric acid is introduced which is at least sufficient for the quantitative formation of dicalcium phosphate dihydrate and then an oxygen-containing magnesium compound is introduced into the reactor. Finally, lime milk is metered into the reactor up to a maximum pH of 6.9, before the sodium pyrophosphate is added to the reactor. The resulting suspension which has a stabilized dicalcium phosphate dihydrate content of 20 to 33% by weight is spray-dried.

An apparatus for carrying out the process comprises besides a stirred reactor 1 two stirrer-equipped slurry containers (6, 7) and an intermediate container 16 from which a line 17 leads into a spray tower 18 where it ends above an atomizer wheel 19. The spray tower 18 is also the end point for hot air lines 20 and is in flow connection with a filter 22. The bottom of filter 22 is the starting point for a product line 24 via which highly adsorbent dicalcium phosphate dihydrate can be withdrawn.

8 Claims, 1 Drawing Sheet

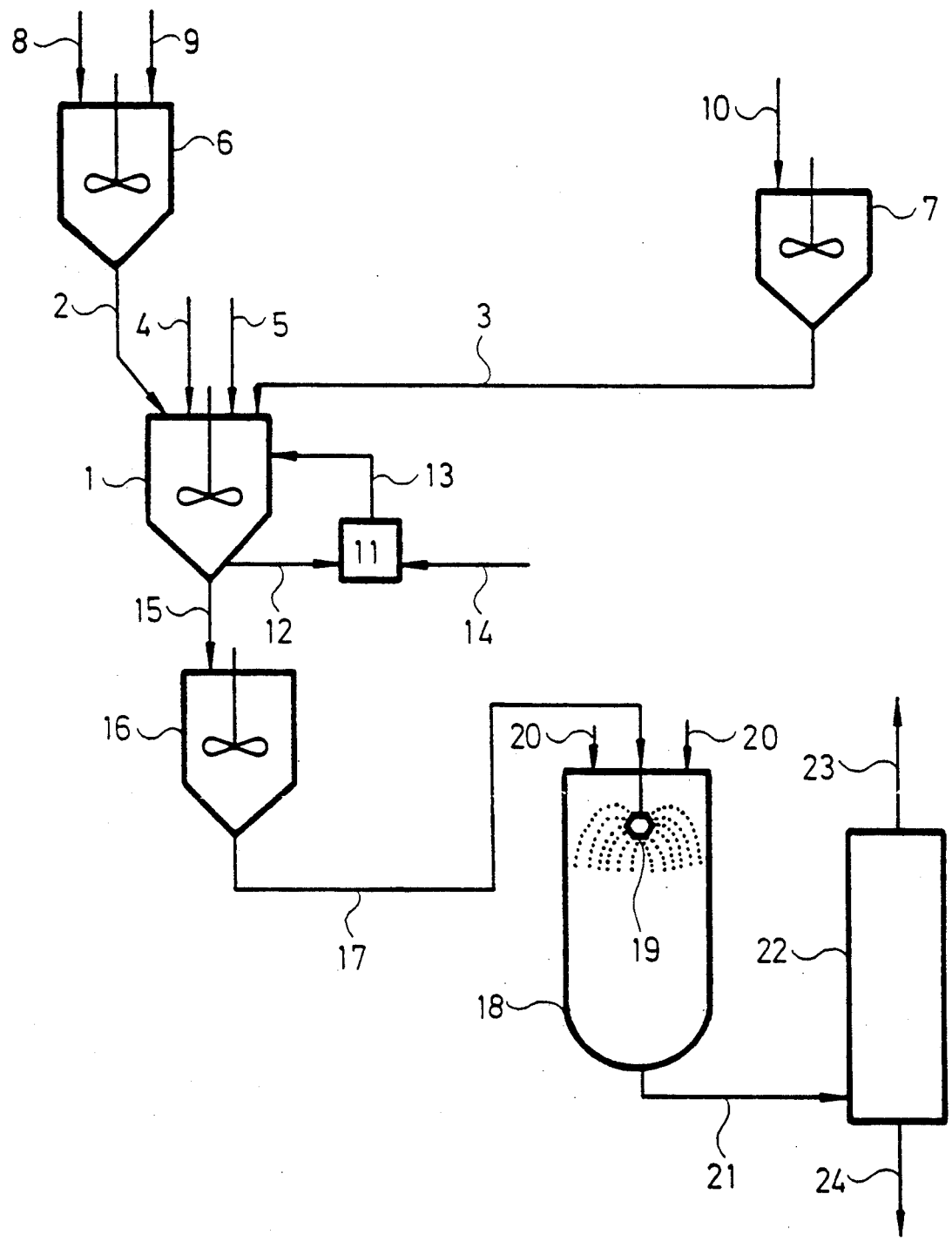

PROCESS FOR THE PREPARATION OF DICALCIUM PHOSPHATE

The present invention relates to a process for the preparation of dicalcium phosphate dihydrate stabilized with dimagnesium phosphate trihydrate and sodium pyrophosphate, in which an aqueous suspension of calcium carbonate is introduced into a reactor equipped with a stirrer and recirculated by pumping at more than 3,000 rpm through a high-speed mixer which is in flow connection with the lower and upper portion of the reactor and an amount of phosphoric acid which is at least sufficient for the quantitative formation of dicalcium phosphate dihydrate is introduced into the mixer and a magnesium compound is subsequently introduced into the reactor and finally an alkaline liquid is metered into the reactor up to a maximum pH of 6.9, before the sodium pyrophosphate is introduced into the reactor, and to an apparatus for carrying out the process.

In Canadian Patent 1,090,531, a process for the preparation of stabilized dicalcium phosphate dihydrate is disclosed, in which water is initially introduced into a reactor equipped with a stirrer and double jacket and a solution or a suspension of a calcium compound and orthophosphoric acid are introduced in an approximately stoichiometric ratio with vigorous stirring and the formation of dicalcium phosphate dihydrate. As stabilizer, first dimagnesium phosphate trihydrate is deposited on the dicalcium phosphate dihydrate by introducing magnesium salt solution, orthophosphoric acid and sodium hydroxide solution, until a pH of greater than 8 is established. As further stabilizer, a small amount of finely divided tetrasodium pyrophosphate is added. After further stirring, the precipitate is finally filtered off, dried and ground.

According to German Offenlegungsschrift 3,705,845, this known process is developed further by using, as calcium compound, a precipitated calcium carbonate having a maximum average particle diameter of 20 μm, in which the calcium carbonate suspension is removed from the lower portion of the reactor and flows back to the upper portion of the reactor through a circuit in which a high-speed mixer which has a capacity of more than 3,000 rpm is present and in which not only the phosphoric acid but also later on the magnesium salt solution are fed in via the high-speed mixer.

The disadvantage of the last-mentioned process is that separating off the solid by the known mechanical separation means either only gives a thixotropic material which has low adsorptivity or—if a good solid/liquid separation is possible—the dried solid needs to be ground, which significantly reduces the high adsorptivity of the dicalcium phosphate dihydrate obtained by the process.

The object of the present invention is therefore to provide a process for the preparation of stabilized dicalcium phosphate dihydrate in which an aqueous suspension of calcium carbonate is introduced into a reactor and recirculated by pumping at more than 3,000 rpm through a high-speed mixer which is in flow connection with a lower and upper portion of the reactor, an amount of phosphoric acid which is at least sufficient for the quantitative formation of dicalcium phosphate dihydrate is introduced into the mixer, a magnesium compound is subsequently introduced into the reactor, an alkaline liquid is metered into the reactor and finally the entire precipitate formed is separated off from the mother liquor, in which the stabilized dicalcium phosphate dihydrate is obtained as free-flowing powder. This is achieved according to the invention by operating the high-speed mixer at 3,500 to 8,000 rpm, preferably 5,000 to 7,000 rpm; by the magnesium compound being oxygen-containing; by the alkaline liquid being lime milk and by spray-drying the resulting suspension which has a stabilized dicalcium phosphate dihydrate content of 20 to 33% by weight.

A further alternative embodiment of the process according to the invention can be such that a) the magnesium compound is solid magnesium oxide;
b) the magnesium compound is magnesium oxide dissolved in phosphoric acid;
c) the magnesium compound is solid magnesium hydroxide;
d) the lime milk has a $Ca(OH)_2$ content of 10 to 30% by weight, preferably 12 to 20% by weight;
e) the spray-drying of the suspension containing the stabilized dicalcium phosphate dihydrate is carried out by means of co-current hot air;
f) the hot air has a temperature of 150° to 350° C., preferably 200° to 300° C.;
g) the atomizing of the suspension containing the stabilized dicalcium phosphate dihydrate is carried out by means of an atomizer wheel;
h) the atomizer wheel is operated at rotational speeds of 100 to 200 m/s.

A plant for carrying out the process according to the invention and comprising a stirred reactor which is in flow connection with a high-speed mixer via a first and second line, a third line for supplying phosphoric acid and opening into the high-speed mixer, a first slurry container equipped with stirrer and disposed upstream from the stirred reactor and an intermediate container disposed downstream from the stirred reactor can be one wherein a second slurry container is disposed upstream from the stirred reactor; a plurality of feed lines open into the stirred reactor; a fifth line leads from the intermediate container to a spray tower; the fifth line terminates inside the spray tower above an atomizer wheel; hot air lines open into the spray tower; a sixth line leads from the spray tower to a filter; a waste gas line leads from the upper region of the filter and the bottom of the filter is penetrated by a product line through which highly adsorbent dicalcium phosphate dihydrate can be removed.

The process according to the invention gives a stabilized dicalcium phosphate dihydrate having an adsorption capacity of 100 to 130 g of water/100 g of dicalcium phosphate dihydrate.

In the process according to the invention, the alkaline liquid used is lime milk and the magnesium compound used is the oxide or hydroxide, so that no foreign ions are introduced into the resulting suspension of the dicalcium phosphate dihydrate.

BRIEF DESCRIPTION OF THE DRAWING

The accompanying drawing shows a diagram of a plan for carrying out the process according to the invention.

Several feed lines (2, 3, 4, 5), of which the first feed line 2 is connected to the bottom discharge of a first slurry container 6 equipped with a stirrer, while the second feed line 3 leads from the bottom discharge of a second slurry container 7 equipped with a stirrer, open into a stirred reactor 1; two inlet lines (8, 9) introduce calcium carbonate and water into the first slurry container 6. Lime milk is introduced into the second slurry container 7 via an inlet line 10. The third feed line 4 introduces an oxygen-containing magnesium compound into the stirred reactor 1, while sodium pyrophosphate powder is introduced into the stirred reactor 1 via a fourth feed line 5. A first line 12 leads from the lower portion of the stirred reactor 1 to a high-speed mixer 11 (for example ®SUPRATON from Krupp), while a second line 13, which leads from the high-speed mixer 11, opens into the upper portion of the stirred reactor 1. Finally, phosphoric acid is introduced into the high-speed mixer 11 via a third line 14. A fourth line 15 leads from the bottom discharge of the stirred reactor 1 to an intermediate container 16 equipped with a stirrer. The bottom discharge of the intermediate container 16 is in flow connection with an atomizer wheel 19 disposed in the middle of the upper portion of a spray tower 18 via a fifth line 17, in which furthermore several hot air lines 20 open into the cover of the spray tower 18. A sixth line 21 leads from the bottom of the spray tower 18 to the lower portion of a filter 22. While a waste gas line 23 is disposed in the cover of filter 22, the bottom of filter 22 is penetrated by a product line 24 through which highly adsorbent dicalcium phosphate dihydrate can be removed.

EXAMPLE 1

30 l of water were initially introduced into a slurry container 6 equipped with a stirrer (see FIGURE), and 5 kg of precipitated calcium carbonate having an average particle diameter of 4 $\mu$m (®SOCAL P2 from Solvay) were suspended therein. Via feed line 2, a suspension was discharged into a stirred reactor 1 which was connected via lines (12, 13) with a high-speed mixer 11 operating by the rotor/stator principle (®ULTRA-TURRAX from Janke and Kunkel). While operating the high-speed mixer 11 at 8,000 rpm, 7.5 kg of phosphoric acid (85%) were introduced into the mixer. The reaction of the calcium carbonate suspension with the phosphoric acid in the turbulent mixing zone led to an increase in temperature from 16° to 32° C. and to a pH of 2.4. The reaction of the calcium carbonate suspension with the phosphoric acid was completed after about 5 minutes. 150 g of magnesium oxide powder were then introduced into the stirred reactor 1 through feed line 4, which increased the pH of the reaction mixture to 2.8. After the addition of 10.4 kg of lime milk (12%) from the slurry container 7 equipped with a stirrer via feed line 3, a pH of 6.4 was measured in the reaction mixture. Finally, 110 g of sodium pyrophosphate were introduced as a further stabilizer into the stirred reactor 1 via feed line 5.

The resulting reaction mixture was discharged from the stirred reactor 1 into an intermediate container 16 equipped with a stirrer, from which it was passed to a cylindrical spray tower 18 (diameter and height 290 cm each) via a line 17. In the spray tower 18, the reaction mixture made contact with an atomizer wheel 19 (diameter: 160 mm), which rotated at about 16,000 rpm (corresponding to a rotational speed of about 135 m/s). Co-current with the reaction mixture, hot air at a temperature of 250° to 300° C. (about 12 $\mu$m$^3$ of air per kg of reaction mixture) was blown into the spray tower 18. Together with the air, the dried product passed via a line 21 to a filter 22, in which it was separated from the air. The waste air being discharged via line 23 had a temperature of 90° to 95° C. The dicalcium phosphate dihydrate which could be removed from product line 24, with an adsorption capacity of 115 g of water/100 g of dicalcium phosphate dihydrate, was highly adsorbent and gave this screening analysis:

99.91% <75 $\mu$m 99.60% <44 $\mu$m

EXAMPLE 2

Example 1 was repeated, except that 180 g of magnesium hydroxide were introduced instead of 150 g of magnesium oxide powder into the stirred reactor 1 via feed line 4.

The dicalcium phosphate dihydrate which could be removed from product line 24 had an adsorption capacity of 120 g of water/100 g of dicalcium phosphate dihydrate and gave the following screening analysis:

99.99% <75 $\mu$m 99.90% <44 $\mu$m

EXAMPLE 3

Example 1 was repeated, except that a mixture of 1.5 kg of phosphoric acid (85%), 1.7 l of water and 200 g of magnesium oxide were introduced into the high-speed mixer 11 instead of 150 g of magnesium oxide, before the remaining phosphoric acid (6.9 kg; 85%) was introduced into the high-speed mixer.

The dicalcium phosphate dihydrate which could be removed from product line 24 had an adsorption capacity of 118 g of water/100 g of dicalcium phosphate dihydrate and gave the following screening analysis:

99.94% <75 $\mu$m 99.90% <44 $\mu$m

EXAMPLE 4

1,500 l of water were initially introduced into a slurry container 6 equipped with a stirrer (see FIGURE), and 372 kg of precipitated calcium carbonate having an average particle diameter of 4 $\mu$m (®SOCAL P2 from Solvay) were suspended therein. Via feed line 2, a suspension was discharged into a stirred reactor 1 which was connected via lines (12, 13) with a high-speed mixer 11 operating by the rotor/stator principle (for example ®SUPRATON from Krupp). While operating the high-speed mixer 11 at 8,000 rpm, 560 kg of phosphoric acid (77.4%) were introduced into the mixer. The reaction of the calcium carbonate suspension with the phosphoric acid in the turbulent mixing zone led to an increase in temperature from 14° to 39° C. and to a pH of 2.4. The reaction of the calcium carbonate suspension with the phosphoric acid was completed after about 5 minutes. 11 kg of magnesium oxide powder were then introduced into the stirred reactor 1 via feed line 4. After the addition of 575 l of lime milk (12%) from the slurry container 7 equipped with a stirrer via feed line 3, a pH of 6.7 was measured in the reaction mixture. Finally, 8.4 kg of sodium pyrophosphate were introduced as a further stabilizer into the stirred reactor 1 via feed line 5.

The resulting reaction mixture was discharged from the stirred reactor 1 into an intermediate container 16 equipped with a stirrer, from which it was passed to a cylindrical spray tower 18 (diameter and height 290 cm each) via a line 17. In the spray tower 18, the reaction mixture made contact with an atomizer wheel 19 (diameter: 160 mm), which rotated at about 16,000 rpm (corresponding to a rotational speed of about 135 m/s). Co-current with the reaction mixture, hot air at a temperature of 250° to 300° C. (about 12 m$^3$ of air per kg of reaction mixture) was blown into the spray tower 18. Together with the air, the dried product passed via a line 21 to a filter 22, in which it was separated from the air. The waste air being discharged via line 23 had a temperature of 90° to 95° C. The dicalcium phosphate dihydrate which could be removed from product line 24, with an adsorption capacity of 112 g of water/100 g of dicalcium phosphate dihydrate, was highly adsorbent and gave this screening analysis:

99.92% < 75 μm 99.90% < 44 μm

We claim:

1. A process for the preparation of dicalcium phosphate dihydrate stabilized with dimagnesium phosphate trihydrate and sodium pyrophosphate, which comprises introducing an aqueous suspension of calcium carbonate into a reactor equipped with a stirrer and recirculating it by pumping at 3,500 to 8,000 rpm through a high-speed mixer flow-connected with a lower and upper portion of the reactor; introducing into the mixer an amount of phosphoric acid at least sufficient for the quantitative formation of dicalcium phosphate dihydrate; then introducing into the reactor an oxygen-containing magnesium compound; metering into the reactor lime milk having a Ca(OH)$_2$ content of 10 to 30% by weight up to a maximum pH of 6.9, before adding the sodium pyrophosphate to the reactor; finally atomizing the resulting suspension having a content of 20 to 33% by weight of stabilized dicalcium phosphate dihydrate by means of an atomizer wheel, and spray-drying the atomized suspension by means of co-current hot air having a temperature of 150° to 350° C.

2. The process as claimed in claim 1, wherein the high-speed mixer is operated at 5,000 to 7,000 rpm.

3. The process as claimed in claim 1, wherein the oxygen-containing magnesium compound is solid magnesium oxide.

4. The process as claimed in claim 1, wherein the oxygen-containing magnesium compound is magnesium oxide dissolved in phosphoric acid.

5. The process as claimed in claim 1, wherein the oxygen-containing magnesium compound is solid magnesium hydroxide.

6. The process as claimed in claim 1, wherein the lime milk has a Ca(OH)$_2$ content of 12 to 20% by weight.

7. The process as claimed in claim 1, wherein the hot air has a temperature of 200° to 300° C.

8. The process as claimed in claim 1, wherein the atomizer wheel is operated at rotational speeds of 100 to 200 m/s.

* * * * *